United States Patent [19]

Zemanek, Jr.

[11] Patent Number: 4,506,548

[45] Date of Patent: Mar. 26, 1985

[54] METHOD OF LOCATING POTENTIAL LOW WATER CUT HYDROCARBON RESERVOIRS IN HIGH WATER SATURATION SANDS

[75] Inventor: Joseph Zemanek, Jr., Duncanville, Tex.

[73] Assignee: Mobil Oil Corporation, New York, N.Y.

[21] Appl. No.: 531,872

[22] Filed: Sep. 13, 1983

Related U.S. Application Data

[63] Continuation-in-part of Ser. No. 336,743, Jan. 4, 1982, Pat. No. 4,413,512, and a continuation-in-part of Ser. No. 382,017, May 26, 1983, abandoned, which is a continuation-in-part of Ser. No. 336,743, Jan. 4, 1982, Pat. No. 4,413,512.

[51] Int. Cl.$^3$ .............................................. E21B 47/00
[52] U.S. Cl. ....................................... 73/152; 364/422
[58] Field of Search ............................ 73/152; 364/422

[56] References Cited

U.S. PATENT DOCUMENTS 4,413,977 11/1983 Zemanek, Jr. ........................ 73/152
4,435,977 3/1984 Gournay ............................. 73/152

Primary Examiner—Howard A. Birmiel
Attorney, Agent, or Firm—A. J. McKillop; Michael G. Gilman; George W. Hager, Jr.

[57] ABSTRACT

A method of identifying potential low water cut hydrocarbon producing zones in sandstone formations lacking significant cementation and having relatively high log-indicated water saturations, implying the presence of significant amounts of unbound water. A formation is logged in a conventional fashion to determine porosity and fractional water saturation along the formation. A linear relation between porosity and water saturation is then derived, preferably by linear regression on pairs of log-indicated porosity and fractional water saturation values, each pair being taken from a different depth along the formation. Irreducible water saturation at any point along the depth of the formation is estimatable from the derived linear function and the log-indicated porosity of a formation at that depth. Potential low water cut pay zones are located by determining irreducible water saturation for at least a length of the formation using the aforesaid linear relation and log-indicated porosity values of the formation along said length, in the manner just described. The irreducible water saturation values thus determined are compared with the log-indicated fractional water saturation values obtained along the same length of the formation, preferably by displaying the two sets of values together in a common log as a function of depth. Depths where the irreducible water saturation approximates or exceeds the log-indicated fractional water saturation are zones in which any hydrocarbons produced will be water free or have a low water cut. The derived linear relationship may also be used with pairs of log-indicated porosity and fractional water saturation values obtained elsewhere within the same formation to identify potential low water cut pay zones at those locations.

8 Claims, 12 Drawing Figures

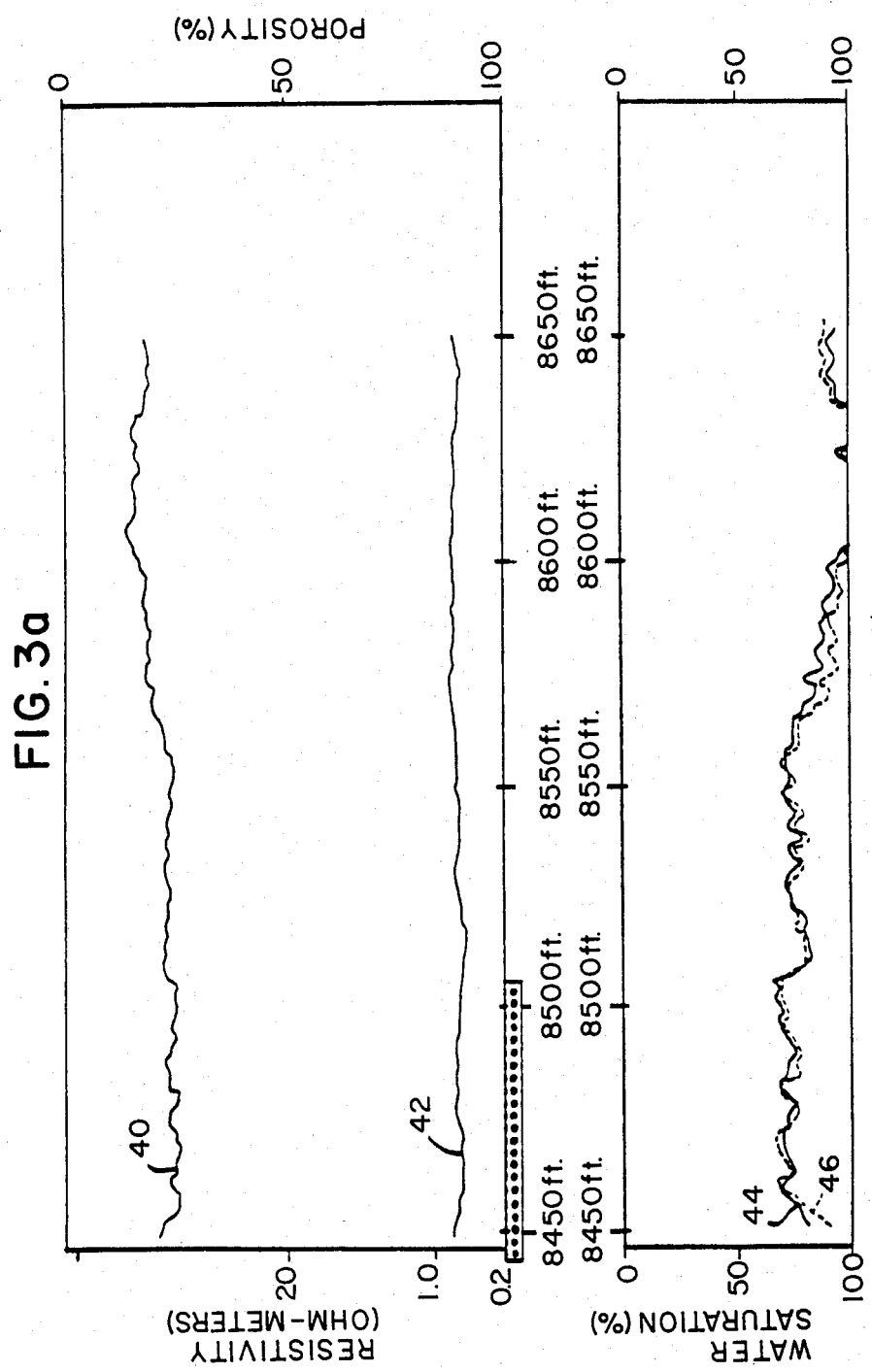

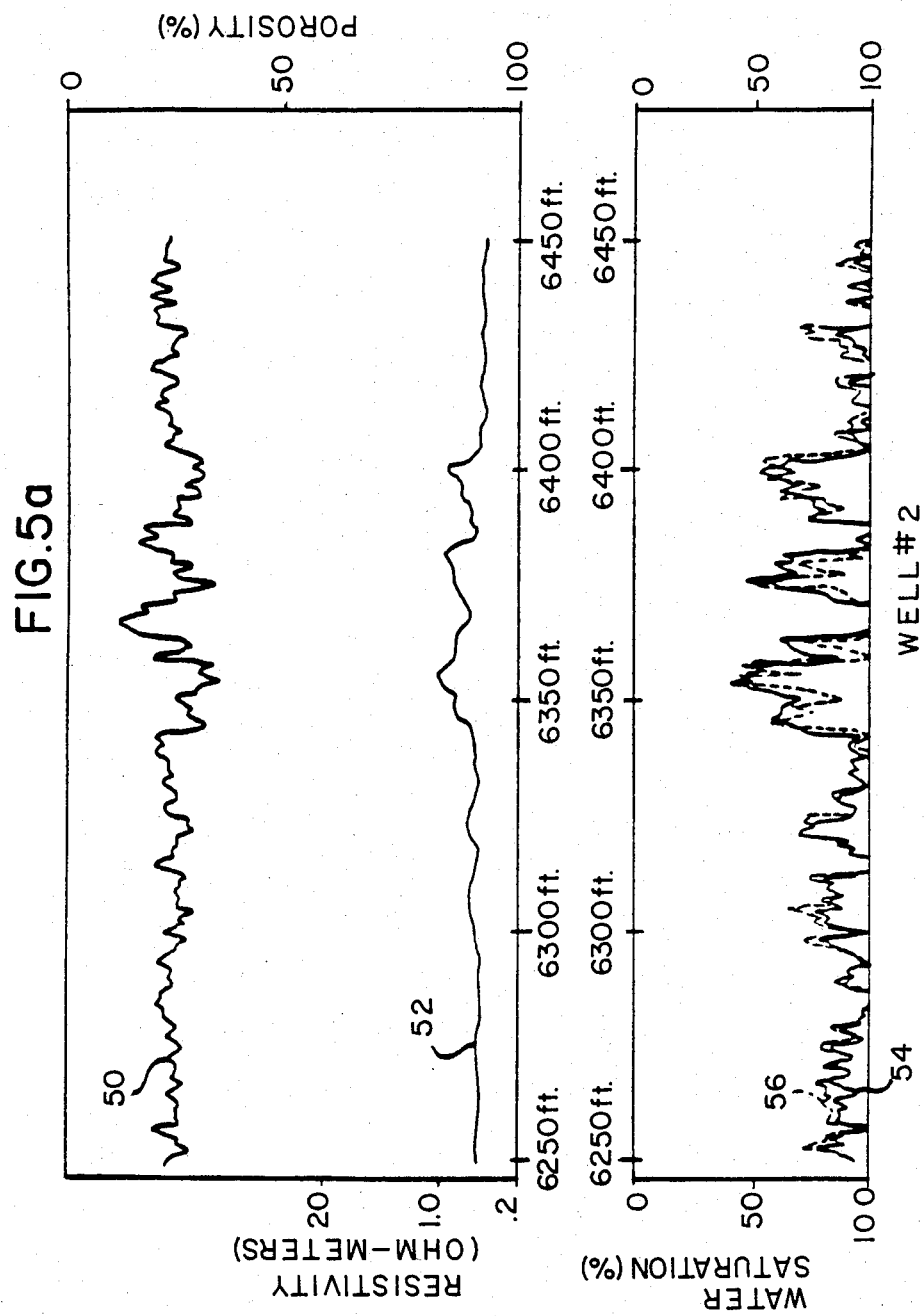

FIG.6b WELL#3

METHOD OF LOCATING POTENTIAL LOW WATER CUT HYDROCARBON RESERVOIRS IN HIGH WATER SATURATION SANDS

This application is a continuation-in-part of U.S. patent application Ser. No. 336,743 filed Jan. 4, 1982, now U.S. Pat. No. 4,413,512. This application is also a continuation-in-part of U.S. patent application Ser. No. 382,017, now abandoned filed May 26, 1983, which in turn is a continuation-in-part of U.S. patent application Ser. No. 336,743, filed Jan. 4, 1982.

BACKGROUND OF THE INVENTION

This invention relates to the area of oil and natural gas exploration and, more particularly, to a method for identifying regions of sand or sandstone formations having significant water saturations from which hydrocarbons may be produced without significant attendant water production.

Subsurface reservoirs of natural gas and petroleum, hereinafter referred to generically as "hydrocarbons" are typically found trapped in permeable geological strata beneath a layer of impermeable strata material. A hydrocarbon will "float" upon any ground water present although typically, a transition zone will exist between the two fluids due to the water being raised by capillary action of the permeable strata material. In some regions, impermeable layers may be relatively closely stacked atop one another trapping thin zones of what may be essentially hydrocarbons, essentially water or mixed hydrocarbons and water. A well bore dropped through the formation and various layers may produce water if tapped in a transition region or mixed hydrocarbon and water zone. The cost of transporting, separating and disposing of the attendant water adds sufficiently to production costs that hydrocarbon reservoirs have often been left untapped where it is expected or believed they would produce an excessive amount of attendant water.

Water saturation present at various levels of a formation is typically determined from interpretation of conventional electrical (i.e., resistivity) logs taken through a borehole dropped through the formation. Water saturation of the available pore space of the formation is determined from the resistivity log measurements using the Archie equation:

$$S_w^n = aR_w/\phi^m R_t \tag{1}$$

Where "$S_w$" is the fractional water saturation (i.e. free and bound water of the formation expressed as a percent of the available pore space of the formation), "a" is a formation resistivity coefficient, "$R_w$" is the formation water resistivity, "$\phi$" is the formation porosity, "$R_t$" is the formation resistivity indicated by the resistivity log, "n" is the saturation exponent and "m" is the porosity or cementation exponent. The Archie equation may be expressed in other ways and there are numerous methods in the art for determining, measuring or otherwise obtaining the various components needed to predict fractional water saturation $S_w$ from the log-indicated resistivity, $R_t$, using the equation in any of its forms.

Low resistivity pay sands are subsurface sand or sandstone formations which indicate low formation resistivity when logged with conventional equipment, implying the presence of a significant amount of water, but produce water-free or relatively low water cur oil or natural gas (i.e. "pay") when tapped. Such sands are located in the Gulf of Mexico and other areas. See for example, E. A. Vajnar, et al "SURPRISING PRODUCTIVITY FROM LOW-RESISTIVITY SANDS," 18th Annual Logging Symposium Transactions, Society of Professional Well Logging Analysts, June 5-8, 1977, Houston Tex.; and J. C. Gauntt et al "The Use of Core Analysis Data to Explain the Abnormally Low Resistivities of Some Hydrocarbon-Productive Simpson Series Sand in Central Oklahoma", 4th Annual Logging Symposium Transactions, Society of Professional Well Logging Analysists, May 23-24, 1963, Oklahoma City, Okla. discussing this phenomena.

Hereinafter "sand" will be used generically to refer to both consolidated and unconsolidated subsurface geological formations of that material. Also "log" will be used to refer to a record of one or more of the characteristics of a formation which varies with depth, including the signals generated by an appropriate logging tool while traversing the formation, as well as to values derived from such signals or several sets of signals. Thus, for example, a porosity log may be derived for a formation from a density log obtained by logging the formation with a density logging tool. The record may have a temporary form like a CRT display or values in a computer memory or a permanent form like a magnetic tape or strip chart.

Several methods ave been proposed to identify low resistivity pay sands. Most involve determining the bound or irreducible water saturation of the formation from laboratory measurements of samples of the formation material and comparing the saturation of each sample to the log-indicated fractional water saturation at the formation level where the sample was obtained. If the former is about equal to or exceeds the latter, it is likely that the water in the formation is bound whereas if the latter exceeds the former, free water exists which will be produced if the formation is tapped at that location. Gathering and analyzing formation samples is both time consuming and expensive. In a related method, the bound water saturation determined from the gathered samples are used to determine a so-called "Productive Resistivity" corresponding to that of a low water cut hydrocarbon reservoir which is then compared directly with the formation resistivity log data. This method is described in the aforesaid Gauntt et al article.

The number of samples needed to determine irreducible water saturation of a formation is reduced in some methods by empirically relating the bound or irreducible water saturation measured from a small group of representative formation samples to a characteristic of the formation which can be measured with or determined from the output of conventional logging tools. These methods are based upon the widely held view that bound water saturations are related in some manner to such characteristics of the formation as its porosity, permeability and/or specific surface area (i.e. surface area per quantity of the formation material). Some of these relationships are summarized by A. Timur in an article entitled "An Investigation of Permeability, Porosity, & Residual Water Saturation Relationships for Sandstone Reservoirs," THE LOG ANALYSTS, pp. 8-17, July-August, 1968. One such method, for example, is to correlate irreducible water saturations, surface areas or both measured from rock samples to a formation shaliness factor determined from conventional Spontaneous Potential, gamma ray or density and velocity logs, and is described by Murphy and Owens in "A New Approach for Low-Resistivity Sand Log Analysis", JOUR. OF PETROLEUM TECH., pp. 1302-1306, November 1972.

Copending application Ser. No. 339,963 filed Jan. 18, 1982, assigned to the same assignee as this application, describes a method of deriving a log of specific surface area of the formation material from which potential low water cut pay may be located in sandstone formations. The specific surface area log is derived from permeability and porosity logs derived from the output of an acoustic or sonic logging tool or such a tool and one or more other tools. The method does not require gathering formation samples if the acoustic log has been previously calibrated to the permeability of the formation. Only one or a few samples need be gathered to accomplish calibration if it is required.

Most pertinent to this application, one method has been reported in the literature for determining irreducible water saturation from log-indicated formation porosity and fractional water saturation values. See *LOG INTERPRETATION Volume I-Principles*, Schlumberger Ltd., New York, N.Y., 1972 Ed., page 104. It is there reported that for a given rock type, plots of porosity and fractional water saturation determined from logs of a given formation "fall in a fairly coherent pattern approximating a hyperbolic curve" of the form $S_{wirr} = C/\phi$, where $S_{wirr}$ is the irreducible water saturation, C is a constant and $\phi$ is the formation porosity. The function is determined by plotting pairs of log-indicated formation porosity and water saturation values on a common graph. Those porosity/water saturation points which are closest to the origin of the graph will conform roughly to the hyperbolic curve representing the irreducible water saturation of the formation.

SUMMARY OF THE INVENTION

It is an object of the invention to provide an improved method of identifying potential low-resistivity pay sands.

It is yet another object of the invention to provide an improved method for predicting irreducible water saturations in sandstone formations lacking significant cementation.

It is yet another object of the invention to provide an improved method for determining irreducible water saturations which does not require obtaining or measuring rock samples of the geological formation being investigated.

It is yet another object of the invention to provide an improved method for predicting irreducible water saturations of sand formations from log-determined porosity and water saturation values.

These and other objects are accomplished by the invention which is an improved method for predicting irreducible water saturation which can be used to identify potential waterfree or low water cut hydrocarbon producing zones in sandstone formations and particularly those lacking significant cementation. The method presumes that clay minerals of substantially uniform composition are disseminated in the formation pore spaces and that formation porosity is inversely proportional to the amount of clay minerals present. It further presumes that irreducible water saturation is directly proportional to the specific surface area of the formation material, that specific surface area is directly proportional to the amount of clay present and thus that irreducible water saturation is inversely proportional to the porosity of the formation in a linear fashion. According to this invention, a length of a borehole into the formation is traversed with logging tools which generate signals indicating the porosity and fractional water saturation of the formation along the length. Formation porosity and fractional water saturation values are determined from the signals. From a multiplicity of pairs of porosity and fractional water saturation values, each pair representing those two values at a given level along said length of the formation, a relation of water saturation as a linear function of porosity is determined. From that function and the formation porosity values from at least a portion of the logged length of the borehole, irreducible water saturation values for that portion of the borehole length are determined and are used to identify potential low water cut hydrocarbon producing zones.

According to an important aspect in the invention, the irreducible water saturation values and fractional water saturation values from said portion of the borehole length are plotted or otherwise arranged in order that they may be compared with one another at the same levels. Those zones along the portion of the borehole length where the irreducible water saturation values approximate or exceed the fractional water saturation values are identified as potential low water cut hydrocarbon producing zones.

According to yet another important aspect of the invention, the linear function may be used with porosity and fractional water saturation values from other portions of the same borehole or with such values from other areas of the formation to identify zones therein where irreducible water saturation approximates or exceeds the fractional water saturation as potential low water cut hydrocarbon producing zones.

BRIEF DESCRIPTION OF THE DRAWINGS

The invention will be better understood with reference to the accompanying drawings in which:

FIGS. 3a and 3b, depict graphically the formation porosity, formation resistivity, resistivity log-indicated fractional water saturation, and determined irreducible water saturation values for the length of the borehole from which the data indicated in FIG. 3a, above, was obtained;

FIGS. 5a and 5b, depicts graphically the formation porosity,, formation resistivity, resistivity log-indicated fractional water saturation and determined irreducible water saturation values for the two, two hundred foot intervals of the well from which the data in FIG. 4 was obtained; and FIGS. 6a and 6b, depicts graphically the formation porosity, formation resistivity, resistivity log-indicated fractional water saturation and determined irreducible water saturation values for a length of a third borehole dropped in the Gulf of Mexico in the vicinity of the second well from which the data in FIGS. 4, 5a and 5b, above, were obtained or determined.

FIG. 7 is an empirical relationship between geopressure H and the natural log of the ratio of the resistivity of a normally pressured shale to the resistivity of the shale being dealt with.

DETAILED DESCRIPTION OF THE INVENTION

Figure 1:
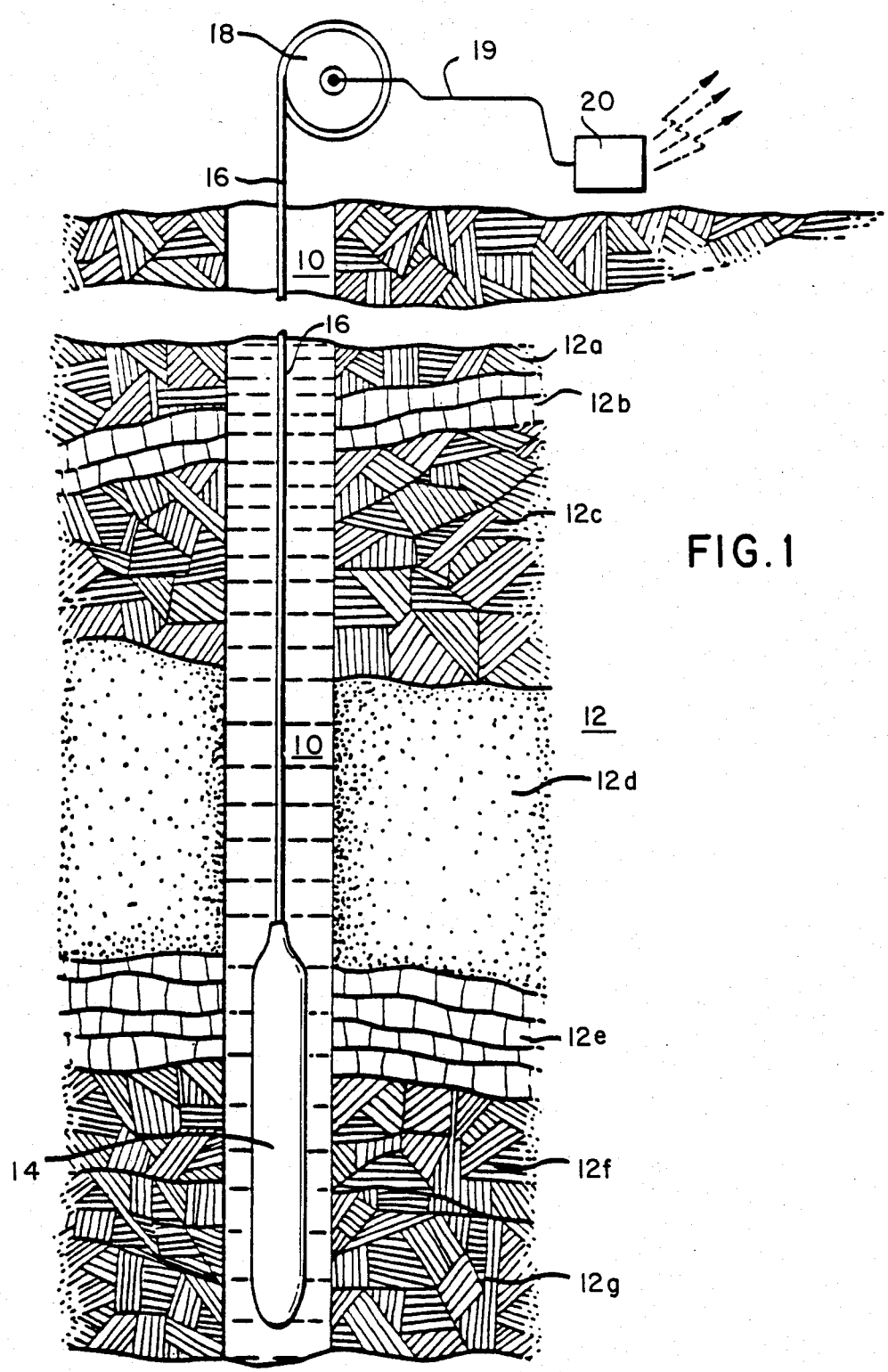
FIG. 1 depicts diagrammatically the logging of a subsurface geological formation.

FIG. 1 depicts a borehole 10 which has been dropped in a typical fashion into a subsurface sandstone formation 12 to be investigated for potential hydrocarbon producing reservoirs. A representative logging tool 14 has been lowered into the bore 10 by means of a cable 16 and is being raised through the formation 12 comprising a plurality of layers 12a through 12g, to log one or more of the formation's; characteristics. Signals generated by the tool 14 as it traverses the borehole 10 are passed through the cable 16 and through suitable circuitry, indicated by line 17, to appropriate surface equipment 18 for processing, recording and/or display or transmission to another site for processing, recording and/or display.

Porosity and fractional water saturation values of the formation, are determined from log data typically gathered in this fashion. The formation may be logged in a single pass using several logging tools strung together or in a pair of passes, each with a separate tool, depending upon the equipment selected. The tools generate signals which are indicative of the porosity or fractional water saturation of the formation material along the borehole. Porosity may be determined in well known ways from measurements obtained by a density logging tool or, if desired from any of several other conventional logging tools including gamma ray, neutron and sonic or acoustic, or from a combination of the measurements of such tools. Water saturation is also determined in well known ways from formation log measurements, typically induction resistivity logs, obtained in the manner depicted in FIG. 1. Zones of significant water saturation (i.e. about 50% or more of the available pore space) may be identified directly from resistivity log measurements by the skilled practitioner as resistivities on the order of about 1 ohm-meter or less typically indicate significant water saturation. Fractional water saturations of the formation may be determined in the conventional fashion from the resistivity log values using the Archie equation (1) identified in the BACKGROUND OF THE INVENTION section, above.

My invention is based upon the following observations and assumptions. If it can be assumed that uniformly sized particles, regardless of their size, yield about 35 to 40% porosity under typical geological conditions, as is a reasonable assumption in most younger sandstones such as the Gulf coast Pleistocene or Miocene formations which have not experienced cementation or significant cementation, and further, that clay material of a substantially uniform composition is disseminated in the pore space and controls the amount of available porosity, which is also reasonable to assume with respect to these younger sandstones, then irreducible water saturation, which has been found to be linearly related to the surface area of the rock and thus to the amount of clay present, should also be linearly related to and thus, determinable from porosity.

Pairs of log-indicated water saturation and porosity values from a multiplicity of levels along the length of the formation which has been logged are used to define a linear relation between formation water saturation and porosity:

$$\text{Water Saturation} = C_1 + C_2 \times \text{Porosity} \qquad (2)$$

where $C_1$ is a constant and $C_2$ is a coefficient representing the water saturation to porosity ratio of the formation. $C_1$ and $C_2$ are preferably determined by conventional, linear regression techniques using the pairs of log-indicated water saturation and porosity values. Linear regression is widely known and explained in numerous texts including, for example, Hamburg, "Statistical Analysis for Decision Making," Harcourt Brace Jovanovich, Inc., pp. 369-370 (1977 2nd Ed.). Irreducible water saturation at any depth in the formation is then determined using the relationship (2) with the constant $C_1$ and coefficient $C_2$ values generated by regression and the log-indicated porosity of the formation for that depth.

Generally speaking, confidence in the accuracy of the relationship (2) is increased by increasing the number of data points (pairs of log-determined fractional water saturation and porosity values) employed in the regression leading to the definition of the constant $C_1$ and coefficient $C_2$. Certain criteria may be employed to select "more desirable" data points for use in the regression. Preferably, data points are first selected from those regions in the formation which have been tapped and have produced water-free or essentially water-free hydrocarbons. The next most preferable data points are taken from regions in which both the formation porosity and resistivity values are relatively high for the formation being investigated or, if conductivity measurements are used to determine water saturation, where such values are low and porosity values are high. In formations having significant water saturation, these regions are the next most likely to be at irreducible water saturation levels. In both cases, the data points are preferably obtained from the well bore under investigation but data points obtained from other nearby well bores may be used if judged to represent the same lithology as the well bore being investigated.

Figure 2A:
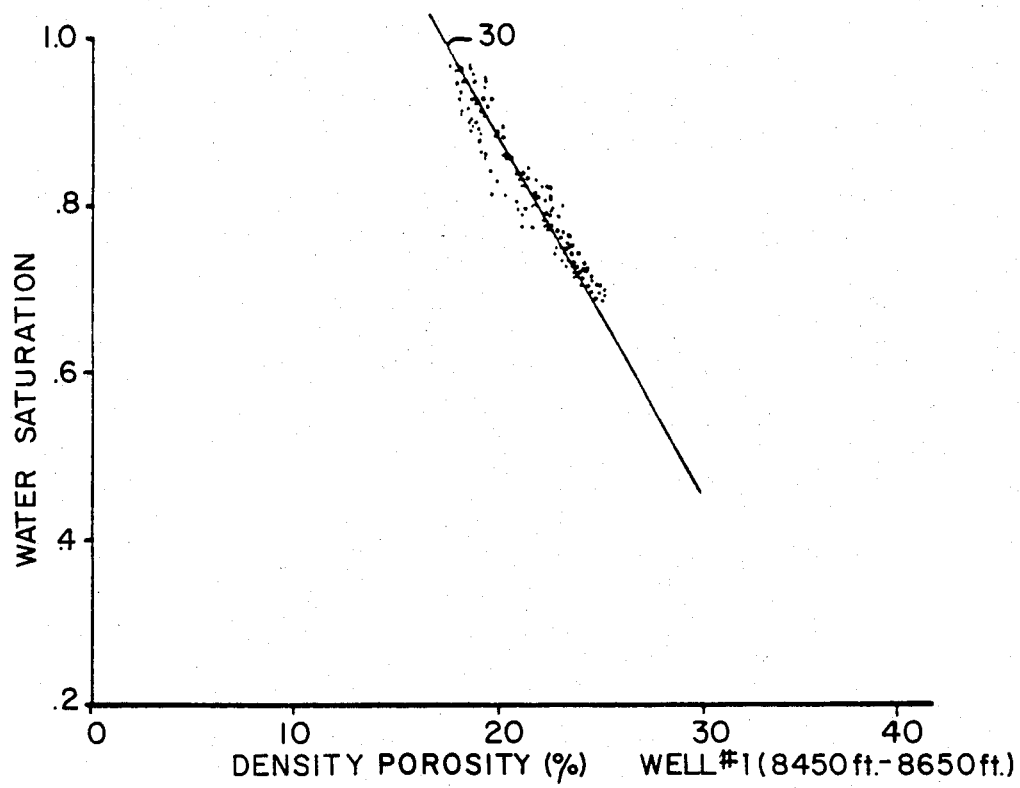
FIG. 2a is a plot of pairs of water saturation-porosity values determined at one foot intervals from log data obtained in a borehole dropped in the Gulf of Mexico.
Figure 2B:
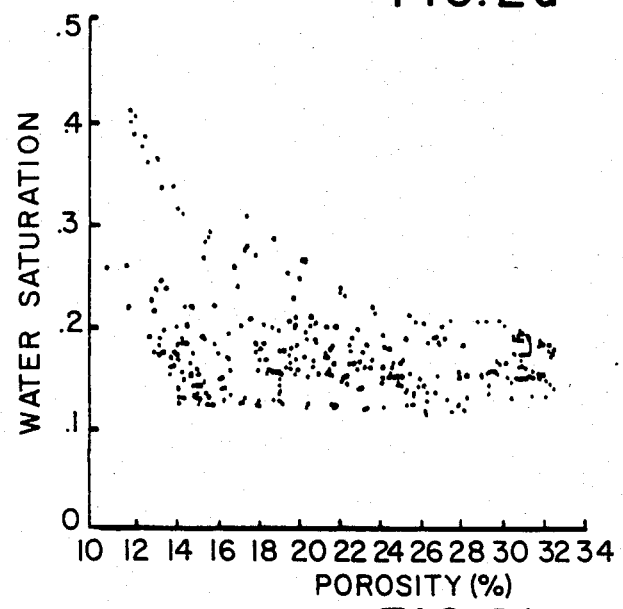
FIG. 2b is a plot similar to FIG. 2a obtained from a borehole dropped in the Saudi peninsula.

Plotting of the log indicated data pairs (fractional water saturation versus porosity) will give a rough indication of whether the formation may be expected to conform to the assumptions and produce the desired linear relation. The selected data should tend to cluster along a straight line as, for example, is indicated in FIG. 2a which depicts data points taken at one foot intervals along two hundred feet of a well bore in the Gulf of Mexico off the Louisiana coast. The samples were taken from a "low-resistivity" region of the Pleistocene formation. The solid line 30 through the data was determined by a linear regression of the two hundred data points and represents the relation:

$$S_{wirr} = 1.6896 - 0.0407 \times \text{Porosity} \qquad (2a)$$

where $S_{wirr}$, the determined irreducible water saturation, is normalized (i.e., ranging between 0.0 and 1.0) and porosity is expressed in percent (i.e., ranging between 0 and 100). Clustering of the data points in FIG. 2a along the line 30 should be compared with a similar set of points plotted in FIG. 2b and obtained from a limestone formation in Saudi Arabia. Not only is there a greater scattering of data in FIG. 2b (although not as significant as it appears due to the slight difference in scaling in FIGS. 2a and 2b), the data exhibits the hyperbolic curve referred to by the prior art. It is believed that curvature of the data is related to the degree of cementation of the formation and that the linear relationship is a more accurate representation where the formation specific surface area is dominated by clay as is typically the case in the younger sandstones where cementation is minor.

FIGS. 3a and 3b depict in two logs, formation porosity, formation resistivity, fractional formation and irreducible water saturations for the two hundred feet of the well bore from which the data in FIG. 2a was obtained. Plot 40 of the FIG. 3a log is the porosity of the formation as determined from density log measurements. Its value ranges linearly from 0.0 at the top to 1.0 at the bottom of the vertical scale of that figure. Plot 42 is the induction resistivity log measurements of the formation ranging logarithmically from 0.2 at the bottom to 20 ohm-meters at the midpoint of the vertical scale of that figure. The porosity plot 40 ranges from about 0.12 to 0.35 (i.e. 12 to 35%) and the formation resistivity plot 42 is less than about 1 ohm-meter over the entire 200 foot range. The solid line plot 44 in the FIG. 3b log is log-indicated formation water saturation (i.e. free and bound water) as determined by the Archie relation (1) from the formation resistivity values 42. The "$aR_w$", "n" and "m" values used are indicated in FIG. 2a. The broken line plot 46 is irreducible water saturation determined from the log-indicated porosity 40 and the aforesaid linear relationship (2a). The vertical scale (water saturation) in the FIG. 3b log ranges from 0.0 at the top to 1.0 at the bottom of that figure and represents the normalized amount of the pore space occupied by the water. Formation depths are indicated between the figures. Both the log-indicated (formation) water saturation values 44 and the irreducible water saturation values 46 are in excess of about 70% through the entire 200 foot interval. As can be seen in the FIG. 3b log, the irreducible water saturations 46 are very close to the log-indicated water saturations 44 (less than about 3% variation) over the zone between 8450 and 8512 feet and exceed those values down to about 8600 feet where 100 percent water saturation is indicated. The well had been tapped between about 8450 and 8500 feet prior to this analysis and produced essentially water free gas. The log-indicated and determined irreducible water saturations 44 and 46 were in excess of about 65% in the entire 150 foot zone (i.e., 8450 to 8600 feet) being recovered from those taps.

Figure 4:
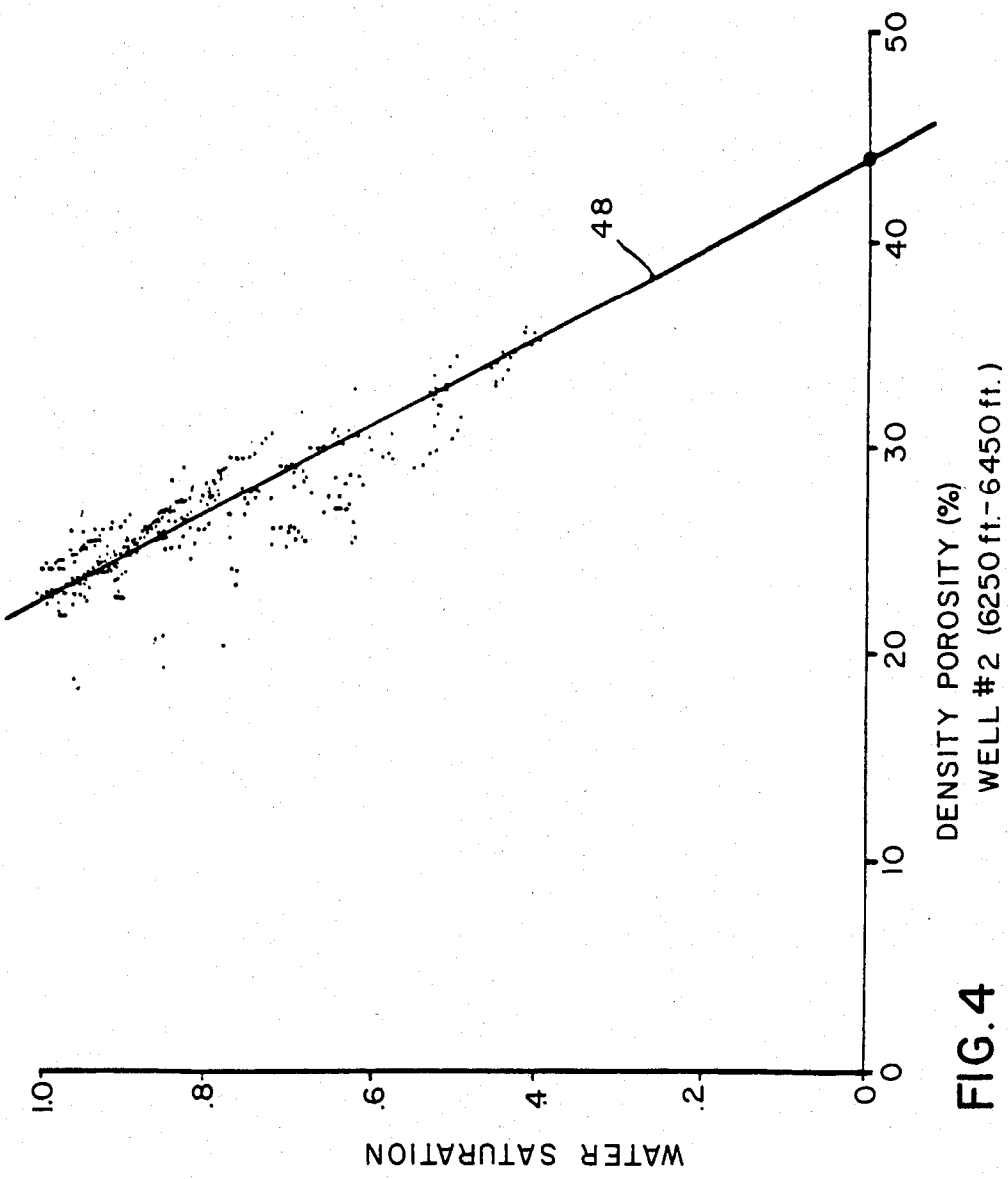
FIG. 4 is a plot of pairs of formation porosity-water saturation values determined at one foot intervals from log data obtained along a two hundred foot length of a second borehole dropped in the Gulf of Mexico.

FIG. 4 depicts a plot of pairs of log-determined porosity and water saturation values determined at one foot intervals over a two hundred foot length (6250 to 6450 feet) from formation density and induction resistivity logs taken in the Pleistocene formation through a second borehole off the Louisiana coast in the Gulf of Mexico. The line 48 through the values of FIG. 4 represents the least squares fit obtained from all 200 data points and the general linear relationship (2) above and represents the particular linear relationship:

$$S_{wirr} = 2.0644 - 0.047115 \times \text{Porosity} \tag{2b}$$

where $S_{wirr}$ is again normalized (i.e. ranges from 0.0 to 1.0) and porosity is a percent (i.e. ranging from 0 to 100).

FIGS. 5a and 5b, depict in the same fashion as FIGS. 3a and 3b, the log-indicated porosity 50, log-measured formation resistivity 52, resistivity log indicated formation water saturation 54 and irreducible water saturation 56 determined from the relationship (2b), above, and formation porosity 50 for the two hundred foot interval (6250 to 6450) from which the data in FIG. 4 was obtained. This well has been perforated between 6350 and 6400 feet and has produced essentially water-free oil. FIG. 5b indicates however that the irreducible water saturations 56 are also quite high but approximate or exceed the log-indicated water saturations 54 in the interval 6250 to 6350 feet indicating that low water cut or possibly water-free hydrocarbons may be recovered from the 6250 to 6350 foot zones as well.

Figure 6A:
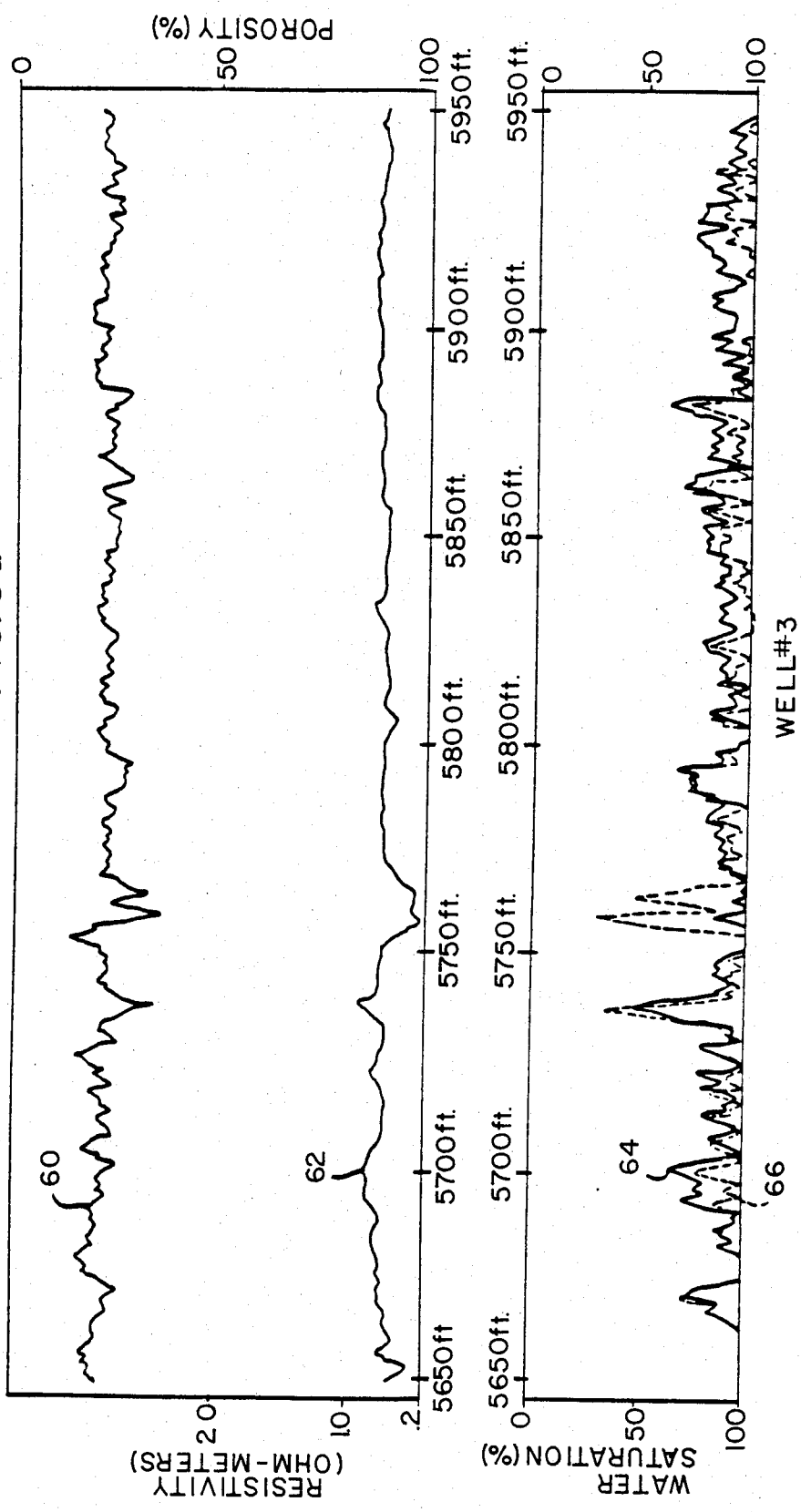

FIGS. 6a and 6b again depict in a fashion similar to FIGS. 3a and 5a–5b, formation porosity 60 determined from a density log, an induction resistivity log 62, log indicated formation water saturations 64 determined from the resistivity log values 62 and the Archie relationship (1) where $aR_w = 0.029$, m equals 1.8 and n = 1.9, and irreducible water saturation 66 determined from the relationship (2b) for the 5650 1 to 5950 foot lengths of a third well bore in the vicinity of the second well bore from which the FIGS. 4, 5a and 5b were generated. Although originally written off as probably being a high water producing well, a comparison of log indicated water saturations 64 are determined irreducible water saturations 66 indicates several potential water-free or low water cut hydrocarbon producing zones. The reserves estimated to be recoverable from the 5692 to 5704, 5732 to 5742 and 5880 to 5940 foot level zones exceed the cost of dropping the well and are expected to be tapped in the near future.

Very often a well is drilled in an area which has no suitable "low-resistivity" intervals which have been tested and determined that water-free or substantially water-free hydrocarbon can be produced. An analysis of the well logs is desired to select suitable intervals for testing. If a nearby well has been tested and an irreducible water saturation Vs porosity relationship can be determined this relationship can be used as a first estimate.

It has been found that the coefficient $C_2$ in relationship (2) is relatively stable. As grain-to-grain loadings on formations change, we have found that the constant $C_1$ changes. Grain-to-grain loading can change due to geopressure or tectonics. This could occur well-to-well or it could also occur comparing irreducible water saturation relationships to porosity at different depths. The constant $C_1$ can reasonably be estimated from an estimate of grain-to-grain load in the following manner. The porosity corresponding to 100% water saturation can be estimated and, using an average value of $-0.0444$ for $C_2$, a new $C_1$ can be calculated as follows:

$$C_1 = 1 - (C_2 \times \phi_{100}) \tag{3}$$

where $\phi_{100}$ is the porosity at which 100% water saturation will occur and water saturation is 1.0. $\phi_{100}$ can be calculated in two ways, firstly:

$$\phi_{100} = A_1 + A_2 C_{sh} \tag{4}$$

where $C_{sh}$ = conductivity of nearby shales in millimho per meter $A_1 = 12.75$ $A_2 = 0.00325$ $\phi_{100}$ in percent (0–100).

This relationship is approximately true in correcting for the grain-to-grain loading since shale conductivity reflects in a quantitative manner the stress condition.

Secondly:

$$\phi_{100} = B_1 + B_2 S \quad (5)$$

where S = estimate of grain-to-grain load in pounds per square inch.

$S = (LOB - (MW/19.26))$Depth $- (LOB - 0.465-)$Depth of water

LOB = Overburden gradient (Gulf Coast nominally 0.95 psi/foot)

MW = Drilling mud weight (pounds per gallon)

Depth = Vertical depth to formation of intent (feet)

Depth of Water = Water depth (if drilling offshore) (feet)

As is well known, more refined methods for calculating grain-to-grain load are known and these can also be used to establish more accurate relationships for calcualting $C_2$. The constant $C_1$ can be estimated by still another method. In general, most clay mineral free sands (the cleanest sands) can be characterized approximately as having about 30% water saturation which occurs at some nominal porosity $\phi_{30}$. The value for $\phi_{30}$ changes as grain-to-grain loading of the formation changes. If a water saturation of 0.3 is substituted into relationship (2), $C_1$ can be calculated as:

$$C_1 = 0.3 - C_2 \phi_{30} \quad (6)$$

and $$C_2 = -0.0444 \quad (7)$$

is used as an average as previously noted.

Figure 7:
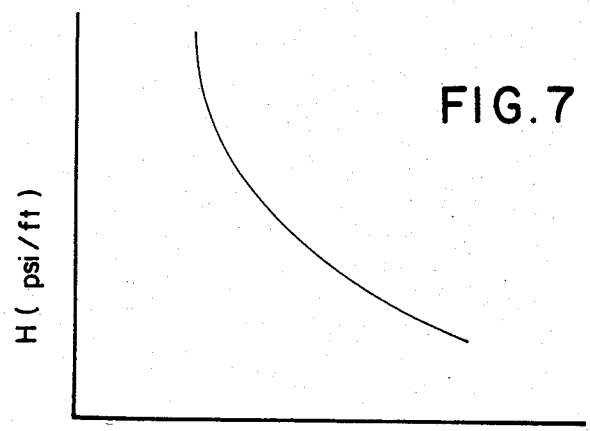

An accurate way of determining grain-to-grain load will now be described in conjunction with FIGS. 7 and 8. FIG. 7 is an empirical relationship between H (the geopressure) from the Hottman-Johnson Gulf Coast published curve and the natural log of the ratio of the resistivity of a normally pressured shale to the resistivity of the shale being dealt with.

Geopressure H is related to pore pressure as follows:

$$H \times \text{depth} = \Delta p. \quad (8)$$

where $\Delta p$ is the excess pore pressure above the normal hydrostatic pore pressure. Pore pressure, p is $$p = p_n + \Delta p. \quad (9)$$

The grain-to-grain load S can be calculated as:

$$S = (LOB - (MW/19.26)) \times \text{Depth} \quad (10)$$

where MW is the mud weight (pounds/gallons) and LOB is the overburden gradient in the area of interest. If a density log is available from the surface to the depth of interest, then LOB×Depth can be calculated as:

$$LOB \times \text{Depth} = \int_o^{\text{Depth}} p_b dD, \quad (11)$$

where $p_b$ is the bulk density from the density log. If the well is being drilled "pressure-balanced" then the mud weight is usch as to exactly balance the pore pressure. That is, $$(MW/19.26) \times \text{Depth} = p = p_m + \Delta p. \quad (12)$$

Figure 8:
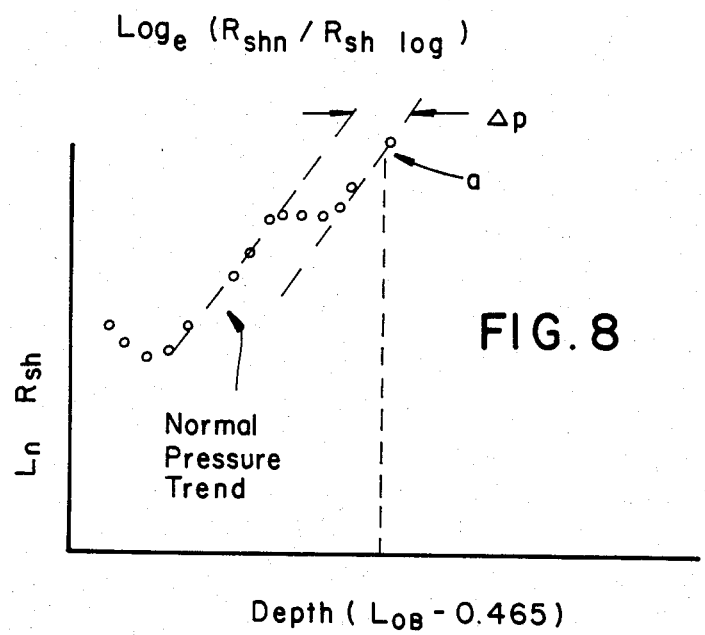
FIG. 8 is an empirical relationship between the natural log of the shale resistivity and depth showing the normal pressure trend.

Normally FIG. 7 is used with FIG. 8.

The point at "a" on FIG. 8 is the depth of interest and it falls off the normal pressure trend. The horizontal distance to the normal pressure trend is $\Delta p$, the excess pressure due to geopressure (or tectonics). FIG. 7 must be used with FIG. 8 if the normal trend line can not be established because sufficient log data is not avaialble. This is done by estimating a normal trend line, determining a $\Delta p$ estimate, moving to FIG. 7 to determine H, determining (Rshm/Rsh log) and moving back to FIG. 8 for a better estimate of the trend line. This process is repeated until answers converge.

Once a $\Delta p$ is determined, S can be calculated as:

$$S = (LOB - 0.465) \text{ Depth} - \Delta p. \quad (13)$$

It will further be appreciated that many of the described manipulative steps can be performed by a suitably programmed computer including the generation of a porosity and fractional water saturation logs from the logging tools signals and irreducible water saturation logs from porosity logs and the comparison of log-indicated fractional and irreducible water saturation values. The computer may also be programmed to generate a list or graph identifying potential low water cut hydrocarbon producing zones or to generate a plot like FIGS. 3a, 5a and 6a or a comparable display from which the zones can be identified by a user.

While the inventive methods have been described, some modifications will no doubt appear to those skilled in the art. Therefore, the above description of the invention should be considered exemplary only and not as a limitation on its scope, which is more properly defined by the following claims.

What is claimed is:

1. Method of locating potential low water cut hydrocarbon producing zones in a formation composed primarily of sand comprising the steps of:

traversing a length of a borehole extending into the formation with logging tools which generate first signals indicating porosity of the formation along said length second signals indicating total water saturation of the formation along said length;

determining from said first and second signals pairs of values representing porosity and fractional water saturation of the formation at a multiplicity of levels along said length;

determining a linear water saturation function from at least a subset of said pairs of values;

determining irreducible water saturation of the formation along at least a portion of said length from said linear water saturation function and the indicated formation porosity along said portion of said length; and plotting the irreducible water saturation and fractional water saturation for said portion of said length of the formation.

2. The method of claim 1 further comprising the steps of:
   comparing said plotted fractional water saturation values and irreducible water saturation values plotted; and
   identifying as a result of said comparing step zones in which the irreducible water saturation values approximate or exceed the fractional water saturation values.

3. The method of claim 1 wherein said step of determining the linear water saturation function comprises fitting a least square linear plot of water saturation as a function of porosity from the subset of pairs of fractional water saturation and porosity values.

4. The method of claim 1 further comprising the steps of:
   traversing a length of a second borehole extending into the formation with logging tools which generate a third set of signals indicating the porosity of the formation along said second borehole length and a fourth set of signals indicating the fractional water saturation of the formation along said second borehole length;
   determining irreducible water saturation along said second borehole length from the linear water saturation function and said second borehole porosity;
   comparing the second borehole fractional water saturation and second borehole irreducible water saturation along said length; and
   identifying as a result of said comparing step those zones along said second borehole length in which the irreducible water saturation approximates or exceeds the fractional water saturation.

5. A method of locating potential low water cut hydrocarbon producing zones in a sandstone formation comprising the steps of:
   traversing a length of a first borehole extending into the formation with logging tools which generate a first set of signals indicating the porosity of the formation along said length and a second set of signals indicating the water saturation along said length;
   determining from said first and second sets of signals pairs of values representing porosity and water saturations of the formation along said length;
   determining a linear water saturation function from a multiplicity of pairs of values of porosity and water saturation of the formation at a multiplicity of levels along said length;
   traversing a length of a second borehole extending into the formation with logging tools which generates a third set of signals indicating the porosity of the formation along the length of the second borehole and a fourth set of signals indicating the fractional water saturation of the formation along the length of the second borehole;
   determining from said first and second sets of signals porosity and fractional water saturation values of the formation along said length of the second borehole;
   determining the irreducible water saturation of the formation along said length of the second borehole from said linear water saturation function adn said porosity values along said length of the second borehole;
   comparing the fractional water saturation values and irreducible water saturation values along said length of the second borehole; and
   identifying as a result of said comparing step those zones along said length of the second borehole wherein the irreducible water saturation values approximate or exceed the fractional water saturation values.

6. The method of claim 5 further comprising the aforesaid comparing step the step of displaying a log of irreducible water saturation values and fractional water saturation values for at least a portion of said length of the second borehole and said step of comparing further comparing the values being displayed.

7. A method of exploring for hydrocarbon reservoirs in a sandstone formation comprising the steps of:
   generating a first log of porosity values for a length of the formation;
   generating a second log of fractional water saturation values for a length of the formation;
   determining a relationship of water saturation as a linear function of porosity from a multiplicity of pairs of said fractional water saturation and porosity values at a multiplicity of levels along said length;
   generating from said linear function and said first log a third log of irreducible water saturation values for the length of the formation;
   comparing the values of said second and third logs along said length of the formation; and
   identifying as a result of said comparing step zones along said length of the formation wherein the irreducible water saturation values of said third log approximate or exceed the fractional water saturation values of said second log as potential hydrocarbon producing zones.

8. The method of claim 7 further comprising before said step of comparing, the step of displaying together said second and third log values at the same levels of the formation and wherein said step of comparing the values further comprises comparing those values being displayed.

* * * * *